United States Patent [19]

Harashima

[11] Patent Number: 5,608,855
[45] Date of Patent: Mar. 4, 1997

[54] METHOD OF AND SYSTEM FOR DISPLAYING THREE-DIMENSIONAL CURVE ON TWO-DIMENSIONAL DISPLAY DEVICE

[75] Inventor: Ichiro Harashima, Hitachi, Japan

[73] Assignee: Hitachi, Ltd., Tokyo, Japan

[21] Appl. No.: 942,383

[22] Filed: Sep. 9, 1992

[30] Foreign Application Priority Data

Sep. 9, 1991 [JP] Japan ................................ 3-229095

[51] Int. Cl.$^6$ ........................................................ G06T 15/10
[52] U.S. Cl. ............................................ 395/142; 395/119
[58] Field of Search ............................ 395/119, 142, 395/140; 175/45

[56] References Cited

U.S. PATENT DOCUMENTS

| 5,043,920 | 8/1991 | Malm et al. | 395/119 |
| 5,193,628 | 3/1993 | Hill, III et al. | 175/45 |
| 5,257,345 | 10/1993 | Malm | 395/140 X |

FOREIGN PATENT DOCUMENTS

| 55-59731 | 5/1980 | Japan | H01L 21/60 |
| 63-232438 | 9/1986 | Japan | H01L 21/60 |
| 61-237438 | 10/1986 | Japan | H01L 21/60 |
| 61-237440 | 10/1986 | Japan | H01L 21/60 |
| 61-294830 | 12/1986 | Japan | H01L 21/60 |
| 62-76731 | 4/1987 | Japan | H01L 21/60 |
| 62-293731 | 12/1987 | Japan | H01L 21/607 |
| 63-257238 | 10/1988 | Japan | H01L 21/607 |
| 1-129430 | 5/1989 | Japan | H01L 21/60 |
| 1-184841 | 7/1989 | Japan | H01L 21/603 |
| 1-273328 | 11/1989 | Japan | H01L 21/607 |
| 2-93880 | 4/1990 | Japan . | |
| 2-156548 | 6/1990 | Japan | H01L 21/607 |

OTHER PUBLICATIONS

Levy et al., "Graphical Visualization of Voritcal Flows by Means of Helicity", AIAA Journal, vol. 28, No. 8, Aug. 1990, pp. 1347–1352.

Schroeder et al., "The Stream Polygon: A Technique for 3D Vector Field Visualtion", IEEE Visualization 1991 Conference, pp. 126–132.

Yates et al., "Streamlines, Vorticity lines, and Vortices Around Three–Dimensional Bodies", AIAA Journal, vol. 30, No. 7, Jul. 1992, pp. 1819–1826.

M. Higashi et al., "New CAD System for Style Design of an Outer Shape", pp. 83–91.

Primary Examiner—Mark K. Zimmerman
Attorney, Agent, or Firm—Antonelli, Terry, Stout & Kraus, LLP

[57] ABSTRACT

In order to display a three-dimensional curve on a two-dimensional display device, a stereographic shape or a tube is generated on the basis of the feature quantity of the curve, and it is displayed on the two-dimensional display screen of the display device instead of the curve or together with the curve. The diameter of the tube is proportional to the radii of curvature of the curve at the individual points of the curve. Lines or stripes corresponding to the torsion of the curve can also be displayed on the side surface of the tube. With this construction, the three-dimensional curve can be grasped stereographically by the use of the conventional two-dimensional display device without preparing any special device for stereoscopic vision. Thus, the capability of expressing the shape of a curved surface which is generated on the basis of such a three-dimensional curve is enhanced in a curve input operation which is the initial stage of a shape design in mechanical CAD or CG.

19 Claims, 7 Drawing Sheets

12 STEREOGRAPHIC SHAPE
11 3-D SPACE CURVE
10 DISPLAY DEVICE

METHOD OF AND SYSTEM FOR DISPLAYING THREE-DIMENSIONAL CURVE ON TWO-DIMENSIONAL DISPLAY DEVICE

BACKGROUND OF THE INVENTION

1. Field of the Invention

The present invention relates to curve generation technology in the designs of shapes, especially the designs of curved surfaces, employing computers in mechanical CAD, CG, etc.

2. Related Art

Heretofore, a curve display method employing a computer has displayed a curve by a line approximation wherein parameter values of equal intervals or ones of unequal intervals dependent upon the curving condition (or curvature) of the curve are put in a function expressive of the curve so as to generate a plurality of points, which are thereafter connected with straight lines. Regarding a method of displaying the feature quantity of a curve, the curving condition of the curve is usually displayed by drawing and displaying tangential vectors, normal vectors, curvature vectors, radius-of-curvature vectors, or the like which extend from arbitrary points on a planar curve displayed on a display screen. As a known example, an evaluation technique for the smoothness of a curve utilizing a curvature distribution (here, the arrangement of radius-of-curvature vectors in a queue along the curve) is disclosed in "Masatake Higashi et al: New CAD System for Style Design of an Outer Shape of a Car Body" contained in 'Toyota Gijutsu', Vol. 33, No. 2, 1983.

Another curve display method of the relevant type is disclosed in the official gazette of Japanese Patent Application Laid-open (KOKAI) No. 93880/1990.

In expressing a curve (termed "planar curve") which exists on a plane (section), even the polygonal line approximation display as in the prior-art method suffices. However, in a case where a three-dimensional curve (also termed "three-dimensional space curve") is to be displayed on a two-dimensional display screen, shape information in a depthwise direction (in a direction perpendicular to the display screen) cannot be expressed. Further, with the method as in the prior art wherein the radius-of-curvature vectors are queued and displayed along the three-dimensional space curve as the feature quantity of the curve, the torsion of the curve cannot be expressed for the following reason: Unlike that of the planar curve, the normal vector or the radius-of-curvature vector of the three-dimensional space curve sometimes has a component in the depthwise direction. In such a case, the magnitude of the true vector is not seen on the two-dimensional display screen, but the magnitude of the vector projected on the display screen is seen.

SUMMARY OF THE INVENTION

An object of the present invention is to provide a method of and system for displaying the feature quantity of a curve in which a three-dimensional space curve can be three-dimensionally grasped by the use of a conventional two-dimensional display device without preparing any special device for stereoscopic vision.

According to the present invention, there is provided a three-dimensional curve display method wherein a three-dimensional curve is displayed by a two-dimensional display device which comprises the steps of generating a three-dimensional shape corresponding to the curve on the basis of a feature quantity of the curve and displaying the three-dimensional shape instead of the curve or together with the curve.

The three-dimensional shape is, for example, a three-dimensional shape generated by a locus which is formed when a circle having an arbitrary radius is moved along the curve serving as a central axis.

Preferably, the radius of the circle is changed depending upon a radius of curvature of the curve at a center of the circle.

It is also possible to subject data expressive of the three-dimensional shape to a perspective transformation, and to display data after the transformation.

The constructions of the other methods and systems of the present invention will be described in detail later.

In general, within a computer, a curve is treated as a shape having no thickness. In a display operation, however, the curve is approximated into a plurality of lines connected in series whose vertices or points of connection are the passing points of the curve, and it is displayed as the set of points having a width of several pixels recognizable with the naked eye on a two-dimensional display device. In the present invention, the curve shall not be treated as the series-connected lines having the width of several pixels on a plane, but it shall be treated as a three-dimensional shape (hereinafter, also termed "tube") having an extent in a three-dimensional space.

In operation, data items on the passing points, control points (or knots), or the like of a curve shape are accepted into a computer through an input module for inputting the curve shape data, and the feature quantity of a curve is calculated on the basis of the curve shape data. Further, a three-dimensional shape originator originates a three-dimensional shape on the basis of the calculated feature quantity, and a display module displays the three-dimensional shape on the display screen of a two-dimensional display device.

More specifically, the three-dimensional shape originator generates a curve equation from the point sequence data of the passing points or control points accepted, and it calculates a Frenet frame (the combination of a tangential vector, a principal normal vector and a binormal vector) from the curve equation. The Frenet frame is utilized as coordinate axes for defining the shape of a tube as the stereographic shape. Subsequently, a circle which moves in the direction of the tangential vector with the curve as a central axis is defined, and the shape data of a solid body obtained by moving the circle along the curve is originated. More preferably, values which depend upon the radius of curvature of the curve are also contained in the feature quantity, and the radii of the individual circles constituting the tube are determined by the values.

According to the present invention, the shape information of a three-dimensional space curve in the depthwise direction thereof can be expressed on a two-dimensional display screen.

Moreover, the torsion of a three-dimensional space curve can be expressed on a two-dimensional display screen in such a way that at least one line (or stripe) lying in a predetermined angular relationship with the principal normal vector of the curve is displayed on the side surface of a tube.

DETAILED DESCRIPTION OF THE PREFERRED EMBODIMENTS

Figure 7:
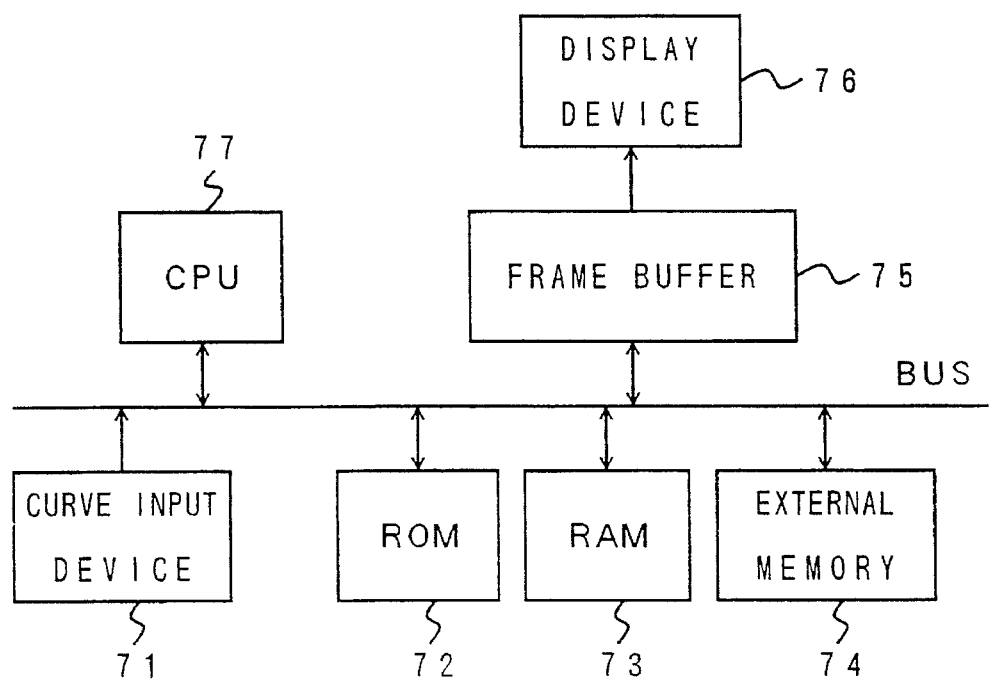
FIG. 7 is a block diagram showing the architecture of a system which realizes the method of the present invention for displaying the feature quantity of a curve.

FIG. 7 illustrates the schematic architecture of a system which performs a display method according to the present invention. This system includes a curve input device 71 through which an arbitrary three-dimensional space curve is input, a ROM 72 and a RAM 73 which are internal memories for storing therein programs, data etc. for the processing of the present invention, an external memory 74, a frame buffer 75 which stores therein dot data corresponding to display coordinates, a display device 76 by which an image written in the frame buffer 75 is displayed on a display screen of two dimensions and a central processing unit (CPU) 77 which controls the whole system.

The specific inputs of the curve input device 71 are, for example, stroke inputs given with a mouse, a stylus pen or the like, the coordinate value inputs of the passing points or control points (or knots) of the curve given with a keyboard, the coordinate value inputs of passing points given with a three-dimensional measuring machine, and image inputs given with a scanner or the like.

Figure 10:
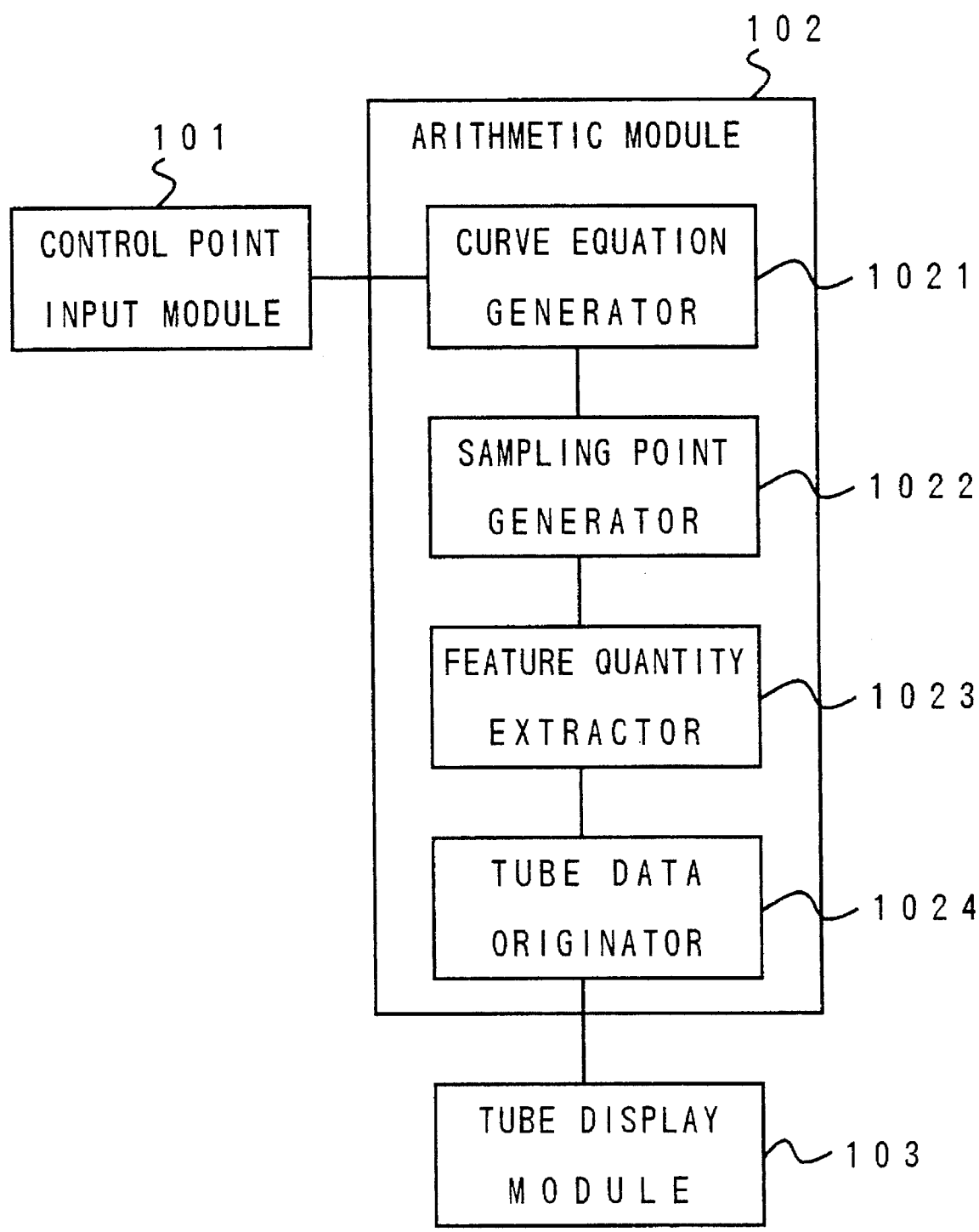
FIG. 10 is a functional block diagram of the system of the present invention for displaying the feature quantity of a curve.

FIG. 10 is a block diagram of the functions of a system for displaying the feature quantity of a curve in this embodiment which is implemented by the system shown in FIG. 7. The curve feature quantity displaying system includes a control point input module 101, an arithmetic module 102 which generates a curve equation and data expressive of a three-dimensional shape (or tube) corresponding to the curve equation on the basis of control points or knots afforded by the control point input module 101, and a tube display module 103 which displays the tube based on the output data of the arithmetic module 102. The control point input module 101 is realized by the curve input device 71 in FIG. 7. The arithmetic module 102 is realized by the CPU 77 and programs stored in memories (e.g., 72 and 73). The tube display module 103 is realized by the frame buffer 75 and the display device 76 in FIG. 7. The arithmetic module 102 includes a curve equation generator 1021 which generates the equation of the three-dimensional space curve on the basis of the input control points, a sampling point generator 1022 which generates sampling points on the curve which determine the boundaries of the unit tubes of the tube, an extractor 1023 which extracts the feature quantity at each sampling point, and a tube data originator 1024 which originates the data of the tube on the basis of a polygon approximating a circle at the sampling point.

Figure 1:
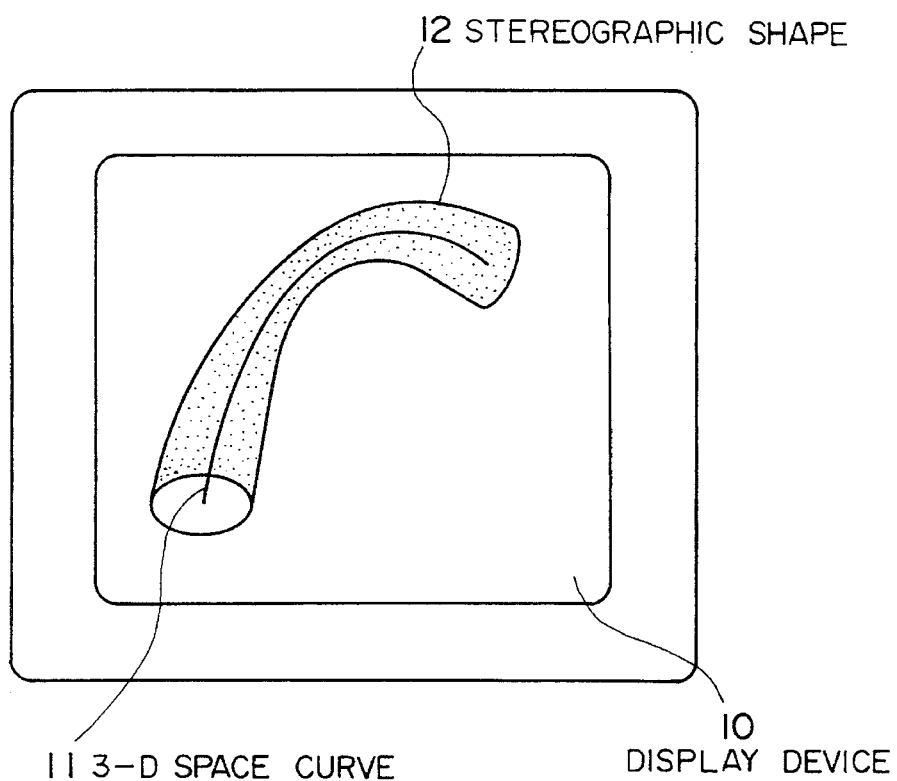
FIG. 1 is an explanatory diagram of a display example according to the present invention in which a three-dimensional space curve afforded as an input to a computer is transformed into a three-dimensional shape (namely, a tube) having radii of magnitudes obtained by multiplying radius-of-curvature vectors by a constant, and in which the tube is mapped onto the curve so as to be displayed on a display device together with the curve.

FIG. 1 illustrates the display example of the three-dimensional space curve which is displayed by the system shown in FIG. 10. In this example, a three-dimensional space curve 11 afforded as an input to a computer is transformed into a tube 12 whose radii correspond to the values of the feature quantity of the curve (here, magnitudes obtained by multiplying the radii of curvature of the curve by a constant), and the tube 12 is mapped onto the curve 11 and is displayed together with the curve 11 by a display device 10 (corresponding to the display device 76 in FIG. 7). Accordingly, the radius of the tube 12 is large at the part of the curve 11 having a large radius of curvature, in other words, having a small curvature (curving little). To the contrary, the radius of the tube 12 is small at the part of the curve 11 having a small radius of curvature, in other words, having a large curvature. Incidentally, the radii of curvature can be replaced with the inverse numbers thereof (the curvature themselves).

Here, let's consider a case where the curve 11 twists or is torsional (that is, a case where all the radius-of-curvature vectors of the curve 11 are not coplanar). With the prior-art method wherein the radius-of-curvature vectors are displayed in a queue or in sequence along the curve, the magnitudes of the vectors differ depending upon directions in which the user of the display system views the display. In the case where the curve 11 is torsional, only the vectors parallel to the screen of the display device 10 exhibit correct magnitudes, and the other vectors are displayed so to be smaller than the actual magnitudes. At the part where the vector is displayed short, therefore, it is impossible to judge whether the vector is seen short on account of the small radius of curvature of the curve or it is seen short on account of the torsion of the curve.

According to the present invention in which the three-dimensional space curve is displayed in the form of the tube, the diameters of the tube do not differ depending upon the viewing directions. Therefore, even when all the radius-of-curvature vectors are not coplanar, the diameters of the tube exhibit the values obtained by multiplying the radii of curvature by the constant. Thus, with the tube display, the correct radii of curvature can be expressed on the display screen even for the three-dimensional space curve involving the torsion.

As another embodiment of the present invention, the tube can be held at a constant radius. On this occasion, the curvature cannot be expressed. Since, however, the curve has a thickness, the part of the tube on this side of the screen is displayed thick and the part thereof on the far side (seemingly inside) of the screen is displayed thin by a perspective display. Thus, the three-dimensional impression of the three-dimensional space curve can be given in spite of the display on the two-dimensional display screen. The perspective display can be effected by subjecting the three-dimensional data of the tube to a perspective transformation and then displaying the resulting data. A practicable method therefor has been known and is stated in, for example, "Eihachiroh Nakamae and Tomoyuki Nishida: Three-Dimensional Computer Graphics", page 36 et seq., published by Shokodo.

Figure 2:
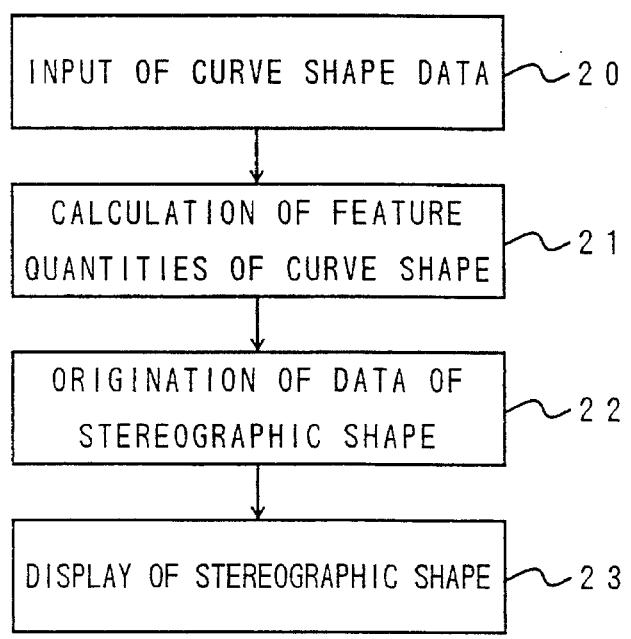
FIG. 2 is a chart of a processing flow for realizing the present invention.

FIG. 2 illustrates a schematic processing flow for realizing the first embodiment of the present invention.

First, in a curve shape data input process 20, curve shape data is input as a file or the like. In a case of, for example, a Bezier curve, the coordinate value data of a control point or knot sequence is mentioned as the curve shape data.

Subsequently, in a curve-shape feature-quantity calculation process 21, a Bezier curve equation (P(t)) is generated from the control point sequence. Also, there are calculated a point sequence (a sampling point sequence) which is generated when the t parameter of the curve is increased from 0 to 1 at equal intervals or at unequal intervals dependent upon the curving condition of the curve, and the Frenet frame (the combination of a unit tangential vector, a unit principal normal vector and a unit binormal vector) and the radius of curvature of the curve at each of sampling points.

Next, in a three-dimensional shape origination process 22, the shape data of a tube is originated from the feature quantities of a curve shape. More specifically, at each point on the curve generated by the curve-shape feature-quantity calculation process 21, a circle is originated so as to have its center at the pertinent point and its radius equal to the radius of curvature multiplied by a constant. The central axis of the circle is the unit tangential vector at the pertinent point. The envelope body of a plurality of circles thus obtained is used as the tube.

The shape data of the tube generated by the three-dimensional shape origination process 22 is finally sent to a three-dimensional shape display process 23 so as to be shaded and displayed by the display device 10.

Figure 9:
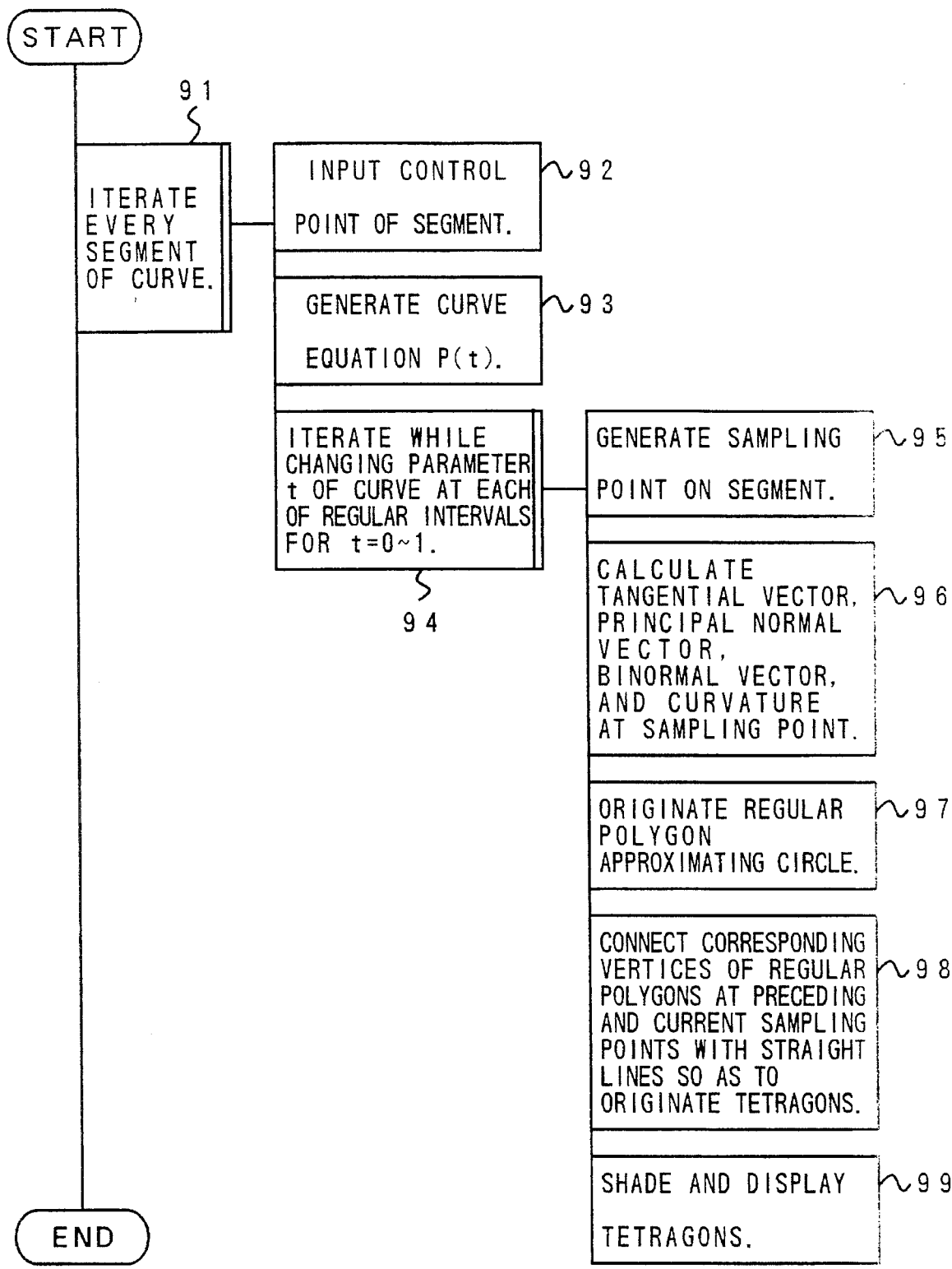
FIG. 9 is a flow chart of a process for displaying the feature quantity of a curve in an embodiment of the present invention.

FIG. 9 illustrates a flow chart of the more detailed processing of this embodiment. The processing is iteratively executed for every segment each segment being a small unit which constitutes the curve (91). First, the control points or knots of the pertinent segment are input (92). The curve equation P(t) is generated on the basis of the control points (93). Subsequently, as to the curve equation P(t) of the pertinent segment, the following processes are iterated while the parameter t is being successively changed at regular intervals from 0 to 1 (94). One sampling point on the segment is generated for the given value of the parameter t (95). The tangential vector, principal normal vector, binormal vector and curvature are calculated at the sampling point (96). Letting P' and P" denote the first-order and second-order differentials of the curve P(t) with respect to the parameter t, respectively, the curvature κ is represented as follows:

$$\kappa = |P' \times P''|/|P'|^3$$

In addition, the unit tangential vector t, the unit principal normal vector n and the unit binormal vector b are respectively represented as follows:

$$t = P'/|P'|$$

$$n = (P' \times P'') \times P'/|(P' \times P'') \times P'|$$

$$b = (P' \times P'')/|P' \times P''|$$

The vectors t, n and b intersect orthogonally to one another. These details are stated in "Fujio Yamaguchi: Form Processing Engineering based on Computer Display [I]", pages 28 et seq., published by Nikkan Kogyo Shinbun-sha.

At the next step, a regular polygon approximating the circle whose central axis is the tangential vector t and whose radius is equal to the radius of curvature being the inverse number of the curvature κ as multiplied by the constant is originated at the pertinent sampling point (97). Subsequently, if there is the last or preceding sampling point, the corresponding vertices of the regular polygons at the last and current sampling points are respectively connected by straight lines so as to originate a plurality of planes (98). Each of the planes is a tetragon. Thus, one unit tube (to be described later) whose sections at both its ends are the two polygons is generated. Lastly, the tetragons are shaded and displayed (99).

Incidentally, the polygons are originated at the respective sampling points in the processing of FIG. 9. At the sampling point of small curvature, however, no considerable change in the result of the display is noticed even when the polygon is not originated at the point. Therefore, an alternative measure may well be taken as follows: Whether the curvature at the pertinent sampling point is, at least, equal to a predetermined value, is first checked at the step 96. Only when the curvature is not smaller than the predetermined value, the succeeding steps are executed. That is, when the curvature is smaller than the predetermined value, the steps 97–99 are omitted, and the flow is returned to the step 95.

Figure 3A:
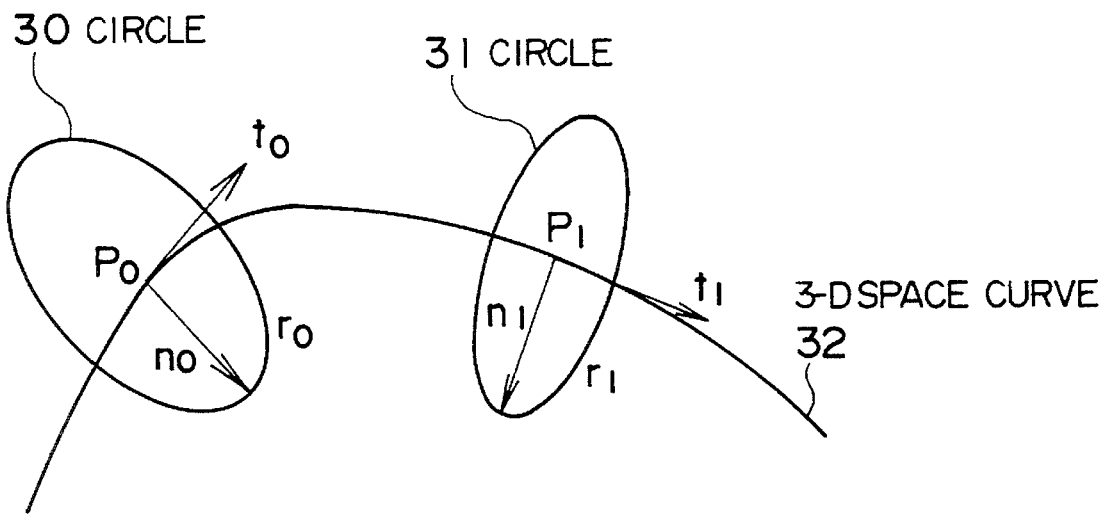
FIGS. 3(a) and 3(b) are explanatory diagrams of a practicable example for realizing the three-dimensional shape generation process shown in FIG. 2, and an example of display units for displaying the side surface of one unit tube, respectively.

FIG. 3(a) shows a specific example of realization of a tube origination/display process. One unitary shape (hereinbelow, called "unit tube") of a tube is defined by two circles 30, 31 in a three-dimensional space and a ruled surface spread between the circles. The single tube is formed by connecting a plurality of unit tubes. The circles 30, 31 are defined in such a way that points P0, P1 on a-three-dimensional space curve 32 are set as the centers of the respective circles, that unit tangential vectors t0, t1 drawn at the points P0, P1 are set as the directions of the central axes of the respective circles, and that the radii r0, r1 of the respective circles are given in the directions of unit principal normal vectors n0, n1 drawn at the points P0, P1.

Figure 3B:
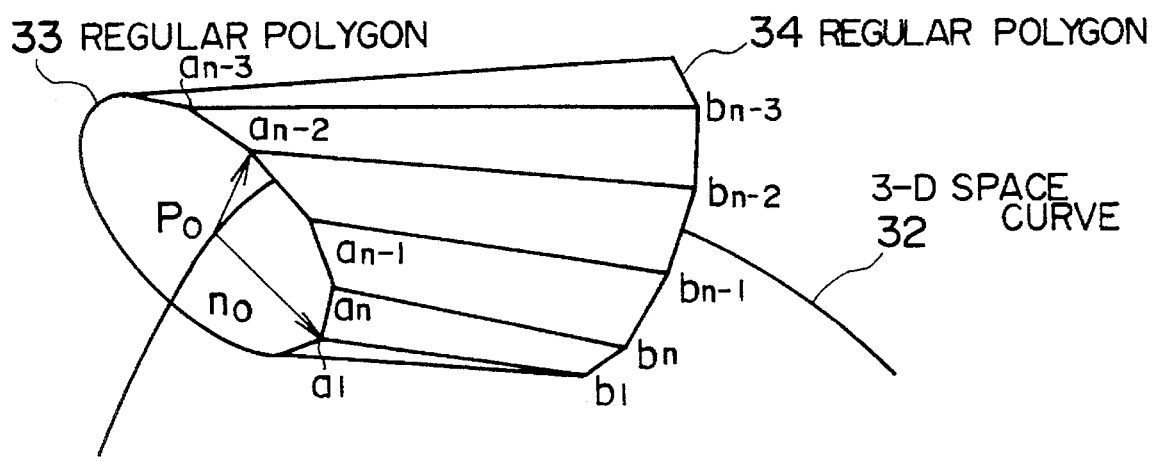

FIG. 3(b) shows an example of a display unit for displaying one side surface of the unit tube. In the display of the tube, the circles 30, 31 are expressed by regular polygons 33, 34 which connect a vertex sequence $a_1, a_{npk}, a_{n-1}, a_{n-2}, a_{n-3}, \ldots, a_1$ and a vertex sequence $b_1, b_n, b_{n1}, b_{n-2}, b_{n-3}, \ldots, b_1$ obtained by equally dividing the circumferences of the respective circles by a natural number n. Here, the vertex $a_1$ is the intersection point between the unit principal normal vector $n_0$ and the circle 30, while the vertex $b_1$ is the intersection point between the unit principal normal vector n1 and the circle 31. On this occasion, the display unit of the side surface of the tube is set as, for example, a tetragonal region meshed in FIG. 3(b), which is surrounded with the vertices $a_{n-2}, a_{n-1}, b_{n-1}$ and $b_{n-2}$.

Figure 4:
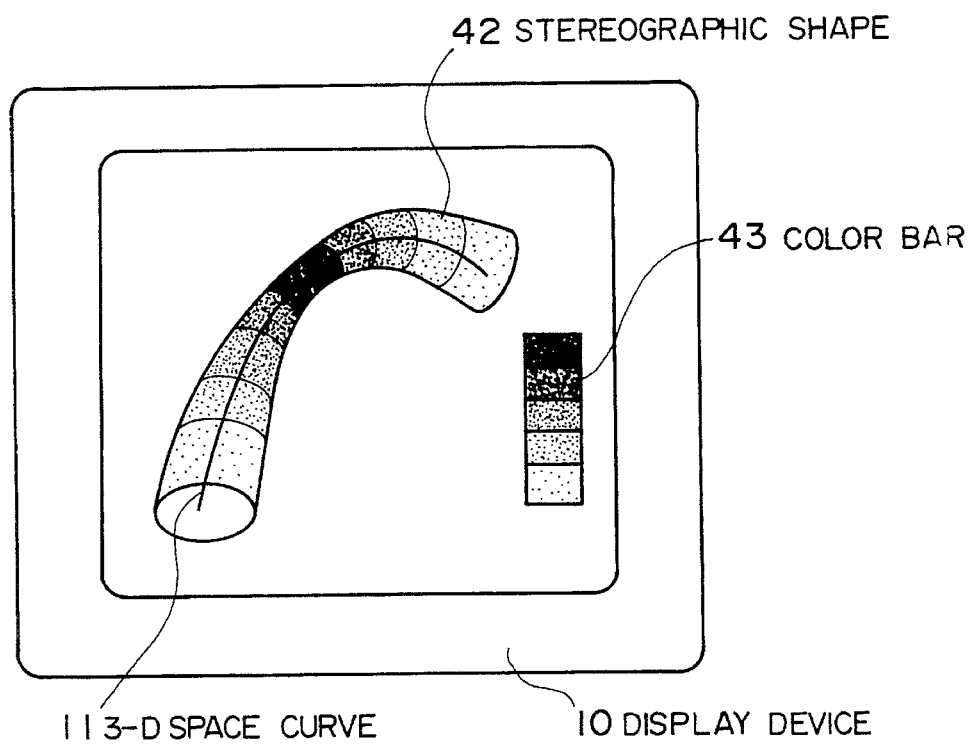
FIG. 4 is a diagram for explaining an example in which the feature quantity of the shape of the curve in FIG. 1 is expressed in terms of the painting colors of the side surface of the tube.

FIG. 4 illustrates an example in which the feature quantity of the three-dimensional space curve in FIG. 1 is expressed by painting the parts of the side surface of the tube in different colors. In this example, the curvature of the curve is considered as the feature quantity. By way of example, the side surface of the unit tube at the part of the curve having the largest curvature is painted in red, whereas the side surface of the unit tube at the part of the curve having the smallest curvature is painted in blue. The part of the curve between the red and blue parts is equally divided, and colors are respectively arranged in the resulting sections so as to vary substantially continuously in the range of human vision. Thus, the bending condition of the curve can be grasped in terms of the color distribution of the side surface of the tube. In the illustrated example, the color distribution is displayed as a color bar 43 on the screen together with the tube or three-dimensional shape 42.

Figure 5:
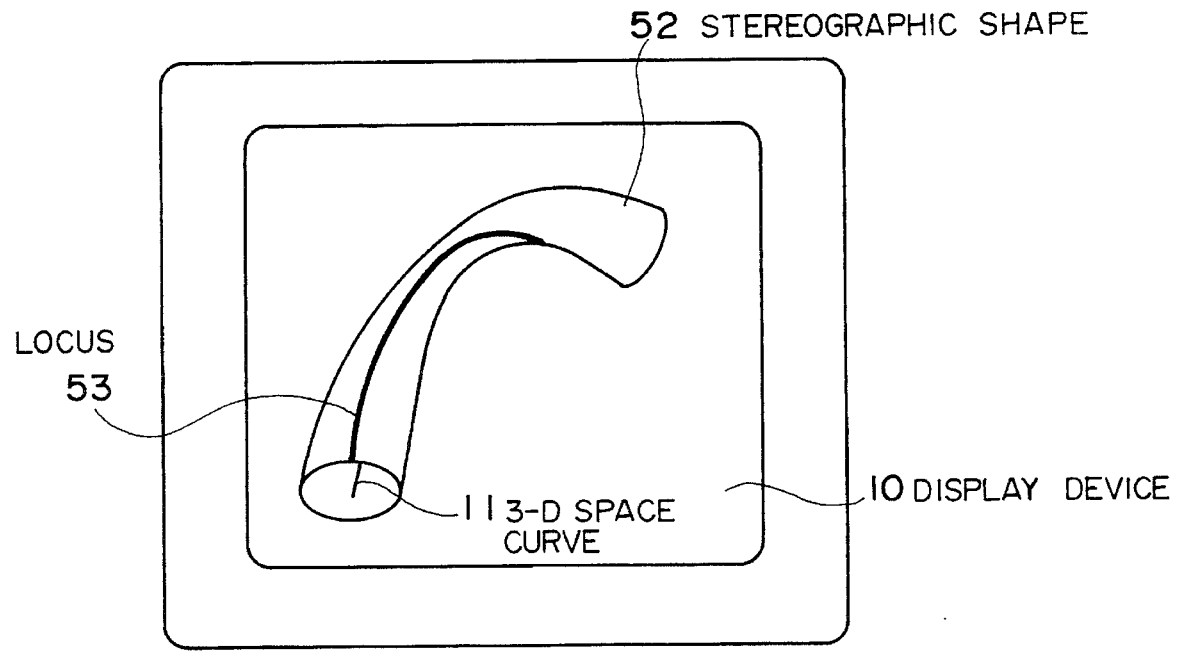
FIG. 5 is a diagram for explaining an example in which, as to the shape of the curve in FIG. 1, the locus of the intersection points between the side surface of the tube and the extensions of binormal vectors having their tails at points on the curve is mapped onto the side surface of a shaded and displayed tube.

FIG. 5 illustrates an example in which, as to the curve shape in FIG. 1, the locus 53 of the intersection points between the side surface of the tube and the extensions of binormal vectors having their tails at points on the curve is mapped onto the side surface of a shaded and displayed tube 52. In a case where the locus 53 is hidden on the reverse side of the tube, the hidden part thereof can be presented on the front side by rotating and displaying the three-dimensional shape 52. Accordingly, the binormal vectors need not always be employed, but principal normal vectors or arbitrary vectors in a fixed angular relationship with the binormal vectors or the principal normal vectors may well be employed. Owing to the example of FIG. 5, that torsion of the curve which cannot be expressed by the example of FIG. 1 can be expressed in terms of the stream of the locus.

A practicable method of realizing this embodiment is as follows: in the unit tube shown in FIG. 3(*b*), a vector extending from the center P0 of the circle to the vertex $a_{n-2}$ of the polygon is assumed to be a binormal vector by way of example. Then, when the interval between the vertices $a_{n-2}$ and $a_{n-1}$ and the interval between the vertices $b_{n-1}$ and $b_{n-2}$ are sufficiently short, the region surrounded with the vertices an-2, an-1, bn-1 and bn-2 is shaded in black. Thus, the locus of the intersection points between the extensions of the binormal vectors and the side surface of the tube is obtained approximately.

Figure 6:
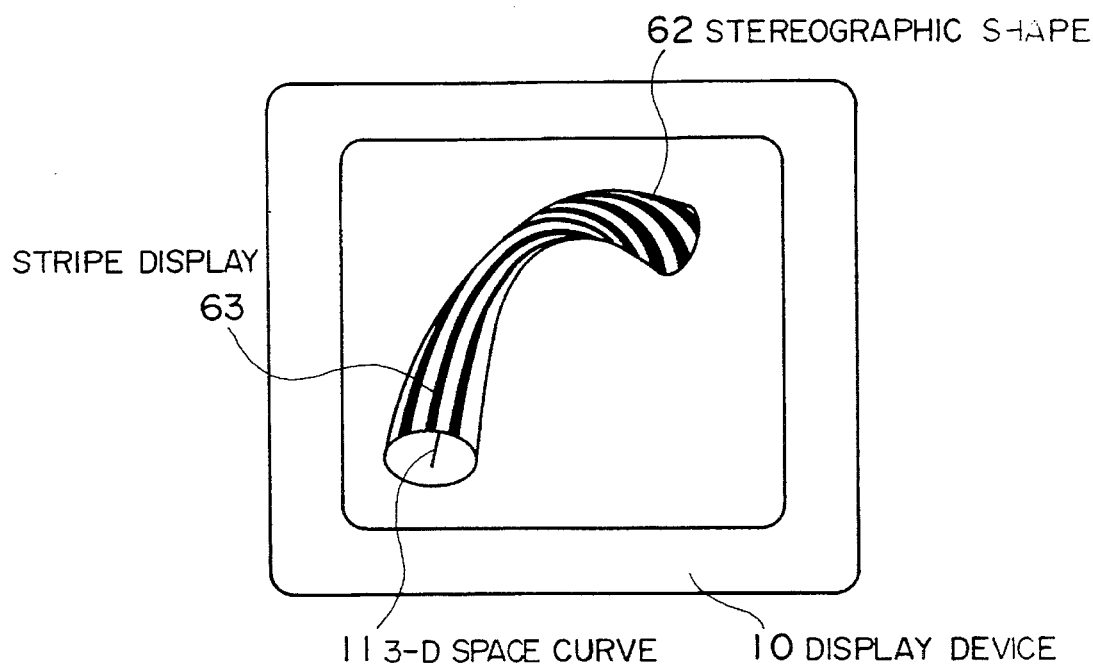
FIG. 6 is a diagram for explaining an example in which an increased number of loci as in FIG. 5 are displayed in a black-and-white striped pattern.

Further, FIG. 6 illustrates an example of a black-and-white striped pattern display (hereinafter, called "stripe display") as another embodiment of the present invention. Here, the whole periphery (360 degrees) of the side surface of a tube or three-dimensional shape 62 is equally divided by an arbitrary even number with reference to a binormal vector or principal normal vector (as 0 degree), and the resulting odd-numbered sections are shaded in white, while the resulting even-numbered sections are shaded in black. In a case where the binormal vector of the curve 11 extends in the depthwise direction of the screen of the display device 10 in the example of FIG. 5, the locus 53 is hidden on the reverse side of the tube 52, and hence, the three-dimensional shape 52 must be rotated in order to see the hidden locus. In this regard, the stripe display is equivalent to displaying a plurality of loci whose angles differ in the circumferential direction of the tube with the binormal vector set at 0 degree. Therefore, even the locus on the reverse side of the tube can be grasped by only the display in a certain direction.

A practicable method of realizing this embodiment is as follows: as in the preceding embodiment, in the unit tube shown in FIG. 3(*b*), each circle is divided by an even number n. Subsequently, regions are alternately shaded in white and black in such a manner as whitening the region surrounded with the vertices $a_1$, $a_2$, $b_2$ and $b_1$, blackening the region surrounded with the vertices $a_2$, $a_3$, $b_3$ and $b_2$, ..., whitening the region surrounded with the vertices $a_{n-2}$, $a_{n-1}$, $b_{n-1}$ and $b_{n-2}$, and blackening the region surrounded with the vertices $a_{n-1}$, $a_n$, $b_n$ and $b_{n-1}$. Thus, the side surface of the tube can be put into the stripe display in the circumferential direction thereof. Incidentally, the black-and-white coloring may well be replaced with the painting of the side surface of the tube in two or more different colors.

Figure 8:
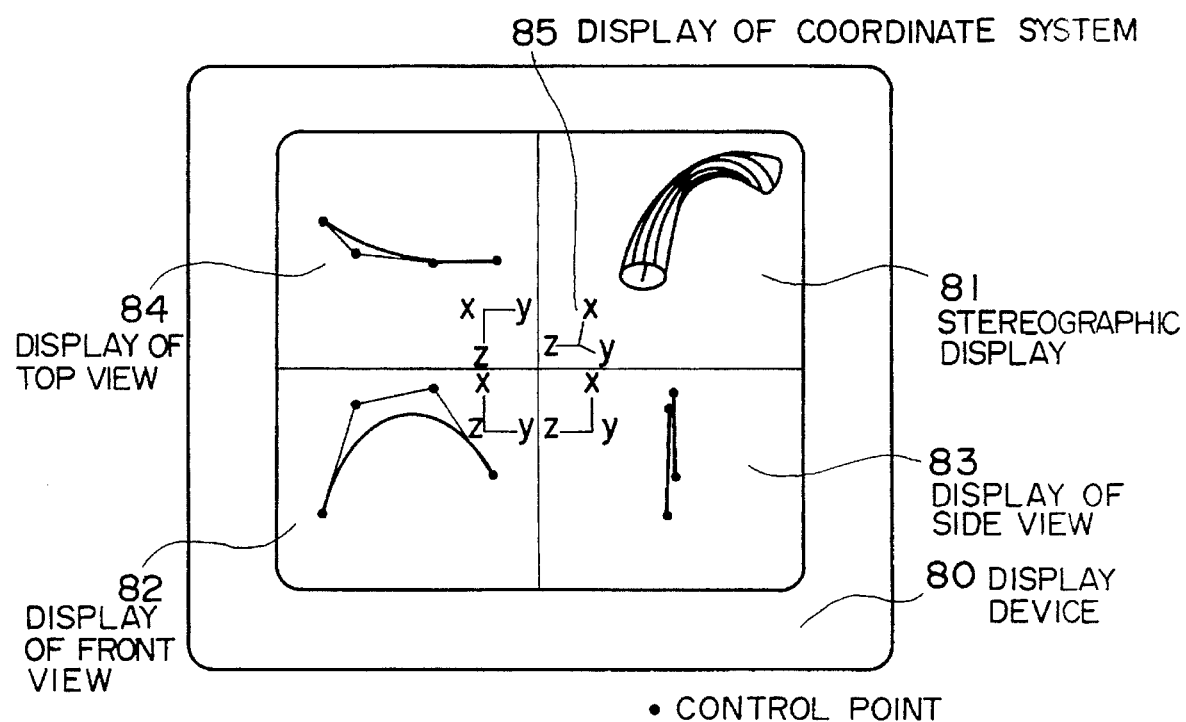
FIG. 8 is an explanatory diagram of an example of application according to the present invention.

Reference will now be made to FIG. 8 showing an example of application in which the present invention is applied to a technique wherein a three-dimensional space curve is input to a computer in terms of the three drawings of a front view, a top view and a side view. The screen of a display device 80 is divided into four areas. The front view 82, side view 83 and top view 84 are respectively assigned to three of the four divisional areas, and the three-dimensional display 81 of a curve according to the present invention is assigned to the remaining divisional area. The illustrated example corresponds to a case where a cubic Bezier curve is defined by control points or knots. The curve can have its shape changed in such a way that the control points are moved by dragging a mouse in each area. The change of the shape of the curve is reflected on the three-dimensional display 81 in real time.

Although the preferred embodiments of the present invention have been described in the above, various modifications are possible without departing from the scope of the present invention. For example, in each of the foregoing embodiments, the three-dimensional display is presented together with the three-dimensional space curve on which it is based, but the display of the curve may well be omitted. Besides, the tube is displayed as the three-dimensional shape. However, in a case where the interval between the adjacent circles (the circles 30, 31 in FIG. 3(*a*)) is small, the objects of the present invention can be accomplished even by shading the circles themselves, not by shading the region surrounded with the four vertices of the circles as shown in FIG. 3(*b*). This method can be realized by applying the same processing as in the display of the locus 53 in FIG. 5 or in the stripe display 63 in FIG. 6, 20 to the sectoral parts of the circles.

According to the present invention, a three-dimensional space curve can be three-dimensionally grasped by the use of a conventional two-dimensional display device without preparing any special device for stereoscopic vision. This makes it possible, not only to input sectional lines, namely, a planar curve as in the prior art, but also to input and grasp a three-dimensional curve, in a curve input operation which is the initial stage of a shape design in mechanical CAD or CG. Accordingly, the capability of expressing a curved surface shape which is generated on the basis of the three-dimensional Curve is enhanced.

What is claimed is:

1. A computer method performed using a computer, wherein a two-dimensional image representing a three-dimensional curve is displayed on a two-dimensional display device, comprising the steps of:

generating, using a three-dimensional shape generating means, a three-dimensional shape related to said curve and having an shape characteristic which is varied to reflect a feature quantity of said curve; and displaying, using said two-dimensional display device, a two-dimensional image of said three-dimensional shape instead of said curve or together with said curve.

2. A computer method as claimed in claim 1, wherein said three-dimensional shape is generated by a locus which is formed when a circle having an arbitrary radius is moved along said curve serving as a central axis.

3. A computer method performed using a computer, wherein a two-dimensional image representing a three-dimensional curve is displayed on a two-dimensional display device, comprising the steps of;

generating, using a three-dimensional shape generating means, a three-dimensional shape by a locus which is formed when a circle having a radius is moved along said curve serving as a central axis; and displaying, using said two-dimensional display device, a two-dimensional image of said three-dimensional shape instead of said curve or together with said curve, wherein the radius of said circle is changed depending upon a radius of curvature of said curve at a center of said circle.

4. A computer method as claimed in claim 2, wherein data expressive of said three-dimensional shape is subjected to a perspective transformation, and data resultant from said transformation is displayed.

5. A computer method as claimed in claim 2, wherein different colors are respectively allotted to ranges of values of said radius of curvature of said curve at centers of the individual circles having the arbitrary radii, and those parts of a side surface of said three-dimensional shape which are expressed by the loci of said circles are respectively colored in the allotted different colors.

6. A computer method performed using a computer, wherein a two-dimensional image representing a three-dimensional curve is displayed on a two-dimensional display device, comprising the steps of;
   generating, using a three-dimensional shape generating means, a three-dimensional shape by a locus which is formed when a circle having an arbitrary radius is moved along said curve serving as a central axis; and
   displaying, using said two-dimensional display device, a two-dimensional image of said three-dimensional shape instead of said curve or together with said curve,
   wherein a locus of intersection points, at which arbitrary vectors defining a fixed angle with either vectors of principal normal vectors and binormal vectors at individual points on said three-dimensional curve intersect a side surface of said three-dimensional shape, is displayed on said side surface.

7. A computer method performed using a computer wherein a two-dimensional image representing a three-dimensional curve is displayed on a two-dimensional display device, comprising the steps of;
   generating, using a three-dimensional shape display device, a three-dimensional shape by a locus which is formed when a circle having an arbitrary radius is moved along said curve serving as a central axis; and
   displaying, using said two-dimensional display device, a two-dimensional image of said three-dimensional shape instead of said curve or together with said curve,
   wherein a side surface of said three-dimensional shape is colored and displayed in different colors into a striped pattern, depending upon angles from binormal vectors at individual points on said three dimensional curve.

8. A computer method as claimed in claim 1, wherein a display screen of said two-dimensional display device is divided into four areas, three drawings with said curve viewed in three different directions are displayed in three of said four areas, and said three-dimensional shape is displayed in the remaining area.

9. A computer method as claimed in claim 2, wherein a display screen of said two-dimensional display device is divided into four areas, three drawings with said curve viewed in three different directions are displayed in three of said four areas, and said three-dimensional shape is displayed in the remaining area.

10. A computer method performed using a computer wherein a two-dimensional shape image representing a feature quantity of a three dimensional curve is displayed on a two-dimensional display device, said method comprising the steps of generating, using a three-dimensional curve generating means, and displaying, using said two-dimensional display device, a shape defined by circles whose radii have values which are changed depending upon radii of curvature of said curve at respective points on said curve respectively, wherein each of said circles has a center being equal to the corresponding point on the curve and a center axis being parallel to tangential vectors of said curve at the corresponding point on said curve.

11. A computer method as claimed in claim 10, wherein corresponding sectoral parts of each of said circles are colored and displayed in colors different from those of other sectoral parts of said adjacent circles.

12. A computer system for displaying a two-dimensional image representing a three-dimensional curve, comprising:
    an input means for inputting shape data of said three-dimensional curve;
    a feature quantity calculation means for calculating a feature quantity of said curve on the basis of the input shape data of said curve;
    a three-dimensional shape origination means for originating a three-dimensional shape related to said curve and having a shape characteristic which is varied to reflect the calculated feature quantity; and
    a display means for displaying the originated three-dimensional shape.

13. A computer system for displaying a two-dimensional image representing a three-dimensional curve, comprising;
    an input means for inputting shape data of said three-dimensional curve;
    a feature quantity calculation means for calculating a feature quantity of said curve on a basis of the input shape data of said curve;
    a three-dimensional shape origination means for originating a three-dimensional shape related to said curve and having a shape characteristic which is varied to reflect the calculated feature quantity; and
    a display means for displaying the originated three-dimensional shape,
    wherein said feature quantity contains values which depend upon a radius of curvature of said curve, said three-dimensional shape is an envelope body of a plurality of circles which lie along a central axis formed of tangential vectors drawn at a plurality of points on said curve and which have radii of values which are changed depending upon said radius of curvature at the respective points, and the radius of each of said circles is changed depending upon a radius of curvature of said curve at a center of said circle.

14. A computer system wherein a two-dimensional image representing feature quantities of a three dimensional curve are displayed on a display device having a two-dimensional display screen, comprising:
    a means for inputting information defining said three-dimensional curve;
    a means for setting a plurality of sampling points on said curve;
    a means for evaluating, at least, tangential vectors and radii of curvature of said curve at said plurality of sampling points;
    a means for originating three-dimensional data of a an shape tube which is formed of an envelope body of a plurality of polygons at said plurality of sampling points, said polygons approximating circles which lie along a central axis formed of said tangential vectors at said sampling points and whose radii have values which are changed depending upon said radii of curvature; and a means for shading a side surface of said shape tube and then displaying said shape tube on said two-dimensional display screen.

15. A computer method performed using a computer, wherein a two-dimensional image representing a three-dimensional curve is displayed on a two-dimensional display device, comprising the steps of:

generating, using a three-dimensional envelope generating means, a three-dimensional envelope related to said curve and having an envelope characteristic which is varied to reflect a feature quantity of said curve; and displaying, using said two-dimensional display device, a two-dimensional image of said three-dimensional envelope instead of said curve or together with said curve.

16. A computer method performed using a computer, wherein a two-dimensional image representing a three-dimensional curve is displayed on a two-dimensional display device, comprising the steps of;

generating, using a three-dimensional envelope generating means, a three-dimensional envelope by a locus which is formed when a circle having a radius is moved along said curve serving as a central axis; and displaying, using said two-dimensional display device, a two-dimensional image of said three-dimensional envelope instead of said curve or together with said curve, wherein the radius of said circle is changed depending upon a radius of curvature of said curve at a center of said circle.

17. A computer method performed using a computer wherein a two-dimensional image representing a three-dimensional curve is displayed on a two-dimensional display device, comprising the steps of;

generating, using a three-dimensional envelope display device, a three-dimensional envelope by a locus which is formed when a circle having an arbitrary radius is moved along said curve serving as a central axis; and displaying, using said two-dimensional display device, a two-dimensional image of said three-dimensional envelope instead of said curve or together with said curve, wherein a side surface of said three-dimensional envelope is colored and displayed in different colors into a striped pattern, depending upon angles from binormal vectors at individual points on said three dimensional curve.

18. A computer system for displaying a two-dimensional image representing a three-dimensional curve, comprising:

an input means for inputting shape dam of said three-dimensional curve;

a feature quantity calculation means for calculating a feature quantity of said curve on the basis of the input shape data of said curve;

a three-dimensional envelope origination means for originating a three-dimensional envelope related to said curve and having an envelope characteristic which is varied to reflect the calculated feature quantity; and a display means for displaying the originated three-dimensional envelope.

19. A computer system for displaying a two-dimensional image representing a three-dimensional curve, comprising;

an input means for inputting shape data of said three-dimensional curve;

a feature quantity calculation means for calculating a feature quantity of said curve on a basis of the input shape data of said curve;

a three-dimensional envelope origination means for originating a three-dimensional envelope related to said curve and having an envelope characteristic which is varied to reflect the calculated feature quantity; and a display means for displaying the originated three-dimensional envelope, wherein said feature quantity contains values which depend upon a radius of curvature of said curve, said three-dimensional envelope is an envelope body of a plurality of circles which lie along a central axis formed of tangential vectors drawn at a plurality of points on said curve and which have radii of values which are changed depending upon said radius of curvature at the respective points, and the radius of each of said circles is changed depending upon a radius of curvature of said curve at a center of said circle.

* * * * *